US009658937B2

(12) United States Patent
Christodorescu et al.

(10) Patent No.: US 9,658,937 B2
(45) Date of Patent: May 23, 2017

(54) OPTIMIZATION OF HARDWARE MONITORING FOR COMPUTING DEVICES

(71) Applicant: QUALCOMM Incorporated, San Diego, CA (US)

(72) Inventors: Mihai Christodorescu, San Jose, CA (US); Mastooreh Salajegheh, San Jose, CA (US); Rajarshi Gupta, Sunnyvale, CA (US); Nayeem Islam, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/660,260

(22) Filed: Mar. 17, 2015

(65) Prior Publication Data

US 2016/0274991 A1 Sep. 22, 2016

(51) Int. Cl.
*G06F 11/34* (2006.01)
*G06F 11/36* (2006.01)
(Continued)

(52) U.S. Cl.
CPC .......... *G06F 11/3466* (2013.01); *G06F 8/443* (2013.01); *G06F 11/302* (2013.01);
(Continued)

(58) Field of Classification Search
CPC .. G06F 11/302; G06F 11/3612; G06F 11/362; G06F 11/3624; G06F 11/3495;
(Continued)

(56) References Cited

U.S. PATENT DOCUMENTS 5,903,759 A * 5/1999 Sun ...................... G06F 11/3466
703/22
6,349,394 B1 * 2/2002 Brock .................. G06F 11/302
709/249

(Continued)

FOREIGN PATENT DOCUMENTS

WO 2013074341 A1 5/2013

OTHER PUBLICATIONS

International Search Report and Written Opinion—PCT/US2016/018659—ISA/EPO—Jun. 22, 2016.

*Primary Examiner* — Matt Kim
*Assistant Examiner* — Paul Contino
(74) *Attorney, Agent, or Firm* — The Marbury Law Group, PLLC (57) ABSTRACT

Various aspects provide systems and methods for optimizing hardware monitoring on a computing device. A computing device may receive a monitoring request to monitor a portion of code or data within a process executing on the computing device. The computing device may generate from the monitoring request a first monitoring configuration parameter for a first hardware monitoring component in the computing device and may identify a non-optimal event pattern that occurs while the first hardware monitoring component monitors the portion of code or data according to the first monitoring configuration parameter. The computing device may apply a transformation to the portion of code or data and reconfigure the first hardware monitoring component by modifying the first monitoring configuration parameter in response to the transformation of the portion of code or data.

28 Claims, 8 Drawing Sheets

(51) Int. Cl.
*G06F 11/30* (2006.01)
*G06F 9/45* (2006.01)

(52) U.S. Cl.
CPC ...... *G06F 11/3003* (2013.01); *G06F 11/3051* (2013.01); *G06F 11/3495* (2013.01); *G06F 11/362* (2013.01); *G06F 11/3612* (2013.01); *G06F 11/3624* (2013.01)

(58) Field of Classification Search
CPC ............. G06F 11/3003; G06F 11/3051; G06F 11/3466
See application file for complete search history.

(56) References Cited

U.S. PATENT DOCUMENTS

| | | | |
|---|---|---|---|
| 7,353,378 B2* | 4/2008 | Vaszary | G06F 9/5083 709/221 |
| 7,577,770 B2 | 8/2009 | Tanaka et al. | |
| 2003/0005423 A1 | 1/2003 | Chen et al. | |
| 2004/0003384 A1 | 1/2004 | Pechtchanski et al. | |
| 2004/0006760 A1* | 1/2004 | Gove | G06F 11/3664 717/100 |
| 2005/0155026 A1* | 7/2005 | DeWitt, Jr. | G06F 8/443 717/158 |
| 2005/0240896 A1* | 10/2005 | Wu | G06F 9/45525 717/100 |
| 2007/0050605 A1* | 3/2007 | Ferren | G06F 11/3612 712/226 |
| 2007/0226698 A1* | 9/2007 | Cascaval | G06F 9/45516 717/127 |
| 2008/0071939 A1* | 3/2008 | Tanaka | G06F 11/3419 710/18 |
| 2008/0235700 A1 | 9/2008 | Iguchi | |
| 2009/0037824 A1* | 2/2009 | Vedula | G06F 11/3051 715/736 |
| 2009/0094590 A1* | 4/2009 | Mendelson | G06F 8/443 717/156 |
| 2009/0313615 A1* | 12/2009 | Joshi | G06F 8/443 717/154 |
| 2011/0145516 A1 | 6/2011 | Adl-Tabatabai et al. | |
| 2012/0233477 A1* | 9/2012 | Wu | G06F 1/3287 713/320 |
| 2013/0067196 A1* | 3/2013 | Michalak | G06F 9/325 712/7 |
| 2013/0159661 A1 | 6/2013 | Trimmer et al. | |
| 2014/0047423 A1* | 2/2014 | Pizlo | G06F 8/443 717/153 |
| 2014/0201357 A1* | 7/2014 | Tang | G06F 11/3466 709/224 |
| 2014/0245273 A1* | 8/2014 | Raikin | G06F 8/4434 717/151 |
| 2015/0007153 A1* | 1/2015 | Martinez | G06F 8/4434 717/159 |
| 2015/0378872 A1* | 12/2015 | Kim | G06F 11/3688 717/124 |

* cited by examiner

202
```
010   for (m = 0, m < 2, m++) {
011       for (n = 0; n < 2, n++) {
012           table[m, n] = m + n;
013           sum = sum + table[m, n];
014       }
015   }
```

202-a
```
000   m = 0;
001   n = 0;
002   table[m, n] = m + n;
003   sum = sum + table[m, n];
```

202-b
```
004   n++;
005   table[m, n] = m + n;
006   sum = sum + table[m, n];
```

202-c
```
007   m++;
008   n = 0;
009   table[m, n] = m + n;
00A   sum = sum + table[m, n];
```

202-d
```
00B   n++;
00C   table[m, n] = m + n;
00D   sum = sum + table[m, n];
```

302    ┌  010    public void addLast (int total) {
       │  011        if (head == null) addNode(total);
       │  012        else {
       │  013            node<int> temp = head;
       │  014            while (temp.next != null) temp = temp.next;
       │  015            temp.next = new Node<int>(total, null);
       │  016        }
       └  017    }
```

⇩

```
302-a   ┌  000    node<int> temp = head;
        └  001    monitorCheck(temp);

302-b   ┌  002    temp = temp.next;
        └  003    monitorCheck(temp);

302-c   ┌  004    temp = temp.next;
        └  005    monitorCheck(temp);

302-d   ┌  006    temp = temp.next;
        │  007    temp.next = new Node<int>(total, null);
        └  008    monitorCheck(temp);
```

502
Class Primates
    returnOrder : function();

Class Homo.Primates
    returnGenus : function();

Class Sapien.Homo.Primates
    returnSpecies : function();

504
Adam = new Sapien();
Adam.returnOrder();

506
Adam = new Sapien();
Adam.returnOrder();

conditionCheck(Adam, class Primates);
MethodResolution():

OPTIMIZATION OF HARDWARE MONITORING FOR COMPUTING DEVICES

BACKGROUND

Various computing devices, including desktop computers, laptops, and mobile communication devices such as smart phones, include software code that may act upon data stored in memory. This software may be various operating system processes or applications installed on the computing device. In such computing devices, data access and code execution is usually monitored and is beneficial for improving the security, performance, and reliability of the devices. For example, code execution and data access may be monitored for anomaly detection and access control security issues that may occur when unauthorized users or programs attempt to access or manipulate the computing device. In another example, code execution is monitored for profiling the performance of various code paths, modules, or libraries. In another example, code execution is often monitored to measure the reliability of the program.

Monitoring on computing devices may be accomplished through a monitoring engine installed on the computing device. Monitoring engines may be either software monitors or hardware monitors. Software monitors monitor the execution of high level software code on the computing device, whereas hardware monitors monitor particular low level code instructions and data memory addresses. In hardware monitoring a limited amount of code or data is monitored, which reduces its flexibility. For example, hardware monitors may only be able to monitor a small portion of memory addresses within the computing device's memory store, meaning that large portions of the device memory are not testable by the hardware monitor. Hardware monitors may also be configured to monitor certain types of instructions, for example instructions related to memory, and thus would not be able to monitor a wide variety of software instructions. In addition, the monitoring demands may vary widely between processes or even between executions of the same process. For example, depending on a process' workload, a memory being monitored may be accessed with very high or very low frequency.

Thus, hardware monitoring lacks the flexibility of software monitoring to monitor a wide range of software code and data. Hardware monitoring may also be inefficient at handling changes in software behavior, which may increase the resource overhead necessary to conduct the monitoring. Inefficient hardware monitoring takes up more device resources, such as memory or processor time, that would otherwise be allocated to the operating system of the device or applications executing on the device.

SUMMARY

Various aspects provide methods, devices, and non-transitory processor-readable storage media for optimizing hardware monitoring on a computing device. Various aspect methods may include receiving, on the computing device, a monitoring request to monitor a portion of code or data within a process executing on the computing device, and generating from the monitoring request a first monitoring configuration parameter for a first hardware monitoring component in the computing device. The method may further include identifying a non-optimal event pattern that occurs while the first hardware monitoring component monitors the portion of code or data according to the first monitoring configuration parameter, and applying a transformation to the portion of code or data and reconfiguring the first hardware monitoring component by modifying the first monitoring configuration parameter in response to the transformation of the portion of code or data.

In some aspects, the method may further include determining whether the transformation of the portion of code or data improved the performance of the non-optimal event pattern, and undoing the transformation of the portion of code or data and the reconfiguring of the first hardware monitoring component when the transformation does not improve the performance of the non-optimal event pattern. In some aspects, identifying the non-optimal event pattern may further include analyzing the performance of the first hardware monitoring component as it monitors the portion of code or data. In such aspects, the non-optimal event pattern may occur when the first hardware monitoring component exceeds a performance slowdown threshold at least once.

In some aspects, applying the transformation to the portion of code or data may include relocating the portion of code or data from a first memory location to a second memory location. In such aspects, reconfiguring the first hardware monitoring component may further include modifying the first monitoring configuration parameter to point to the second memory location. In some aspects, applying the transformation to the portion of code or data may include restructuring the portion of code or data. In such aspects, the portion of code or data to be monitored may be within a loop, and reconfiguring the first hardware monitoring component may further include storing a plurality of iterations of the loop in distinct memory locations, and modifying the first monitoring configuration parameter to point to one or more of the distinct memory locations. In some aspects, applying the transformation to the portion of code or data may include adding one or more instructions to the portion of code or data.

In some aspects, applying the transformation to the portion of code or data may further include selecting the transformation from a table associating a plurality of transformations with a plurality of non-optimal event patterns. In such aspects, machine learning may be used to determine the transformation that is selected from the table given the non-optimal event pattern. In some aspects, when the process executing on the computing device is terminated the transformation to the portion of code and data may be deleted. In some aspects, the method may further include generating, on the computing device based on information in the monitoring request, a plurality of monitoring configuration parameters including the first monitoring configuration parameter for a plurality of hardware monitoring components including the first hardware monitoring component.

Various aspects may include a computing device configured with processor-executable instructions to perform operations of the methods described above.

Various aspects may include non-transitory processor-readable media on which is stored processor-executable instructions configured to cause a processor of a computing device to perform operations of the methods described above.

Various aspects may include a computing device having means for performing functions of the operations of the methods described above.

BRIEF DESCRIPTION OF THE DRAWINGS

The accompanying drawings, which are incorporated herein and constitute part of this specification, illustrate exemplary aspects, and together with the general description given above and the detailed description given below, serve to explain the features of the disclosed systems and methods.

DETAILED DESCRIPTION

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "computing device" refers to any one or all of cellular telephones, smart phones, personal or mobile multi-media players, personal data assistants, desktop computers, laptop computers, tablet computers, servers, smart books, palm-top computers, wireless electronic mail receivers, multimedia Internet-enabled cellular telephones, wireless gaming controllers, and similar personal or enterprise electronic devices that includes a programmable processor and memory.

Computing devices often include monitoring mechanisms that are used to monitor the security, performance, and reliability attributes of the computing device. In particular, a hardware monitoring engine may be used to track certain memory addresses, data values, or software code instructions. However, the range of code or data that may be monitored by the hardware monitoring engine is limited. In addition, the hardware monitoring engine is not able to adjust for changes to the varying workload and behavior of different processes and applications that execute on the computing device. Thus, the hardware monitoring engine may take up an inordinate amount of computing resource overhead on the computing device.

In overview, various aspects provide systems and methods for optimizing hardware monitoring on a computing device. A separate unit for optimizing hardware monitoring, a runtime monitor, is present in the computing device. The runtime monitor, or hardware arbiter, may act as a middle layer between the hardware monitoring engine and the resources it is monitoring (processor, memory, etc.). The runtime monitor may be implemented in hardware as a separate circuit that connects to the bus of the computing device and may communicate with the processor, memory, and hardware monitoring engine. The runtime monitor may have firmware that is updateable.

The runtime monitor may receive a monitoring request from a security engine, performance engine, reliability engine, or other engine in the computing device. The runtime monitor may generate one or more monitoring configuration parameters from the monitoring request. The monitoring configuration parameters may instruct one or more hardware monitoring components of the hardware monitoring engine about a portion of code or data to monitor. For example, the monitoring request may be a request to monitor a particular instruction, and the monitoring configuration parameter generated from the monitoring request may be the memory address of the monitored instruction. The monitoring configuration parameter may be used as input to an instruction monitoring component within the monitoring engine so that the instruction monitoring component is informed about which address to monitor.

The runtime monitor may analyze the performance of the one or more hardware monitoring components and identify non-optimal event patterns that occur during monitoring by the hardware monitoring components according to the monitoring configuration parameters. Non-optimal event patterns may include inefficient data or code access tasks that may take up an inordinate amount of time or system resources. For example, a non-optimal event pattern may be that an instruction being monitored occurs at various different memory locations. If the hardware monitoring component has to skip around to different memory pages to find the instruction, the monitoring will take more time than would be the case if the various instances of the instruction are all located within the same memory page. Another non-optimal event pattern may be that an instruction or a data value being monitored is found within a larger loop (e.g., within a for loop, an if-then loop, or a select-case loop). In such cases, the hardware monitoring component has to evaluate the whole loop for instances where the instruction occurs, rather than solely monitoring the instruction or data value.

Once the runtime monitor identifies a non-optimal event pattern, the runtime monitor may apply a transformation to the portion of code or data being monitored. This transformation is intended to improve the non-optimal event pattern by making the monitoring easier. For example, when code being monitored is located on different memory pages, the runtime monitor may transform the code by relocating the code onto the same memory page. Thus, the hardware monitoring component only has to monitor one memory page. In another example, when the monitoring request targets a particular instruction inside a loop, the transformation may be an unrolling of the loop. Unrolling a loop means each iteration of the loop is manually repeated in memory, rather than being stored in a loop structure. The hardware monitoring component may then easily identify and monitor the instructions without having to evaluate the other portions of the loop. In another example, if the portion of code or data is to be monitored only in certain contexts, code may be added that allows the hardware monitoring component to identify when the context occurs. Additional examples of transformations of code or data are described with reference to FIGS. 2-6. Transformations do not change the operation of the process being monitored, but only change the location or configuration of code or data to better suit the operation of the hardware monitoring component.

In addition to transforming the code or data, the runtime monitor may also reconfigure the hardware monitoring component based on or consistent with the transformation. Reconfiguring the hardware monitoring component may include modifying the monitoring configuration parameter associated with the hardware monitoring component to account for changes to the memory location or other attributes of the code or data being monitored to ensure that the hardware monitoring component is still targeting the correct information. For example, if code or data is relocated to different memory addresses, the runtime monitor may modify the monitoring configuration parameter to redirect the hardware monitoring component to the correct addresses. The runtime monitor may then analyze the performance of the non-optimal event pattern after the transformation is applied. If the performance of the event pattern improves, the runtime monitor may apply other transformations to improve monitoring performance even further or may move on to identify another non-optimal event pattern. If the performance of the event pattern does not improve or is degraded, the runtime monitor may undo the transformation of code or data and reconfiguration of the hardware monitoring component, and try another transformation.

The various aspects enable the runtime monitor to improve the performance of the hardware monitoring engine without having to make any changes to the hardware monitoring engine. Also, transformations and reconfigurations may be accomplished on the fly and none of the transformations or reconfigurations may be saved when the process being monitored is terminated. This allows for on-demand or dynamic optimization of monitoring. When a process is executed, monitoring of code or data in the application is optimized over its run-time but then reset when the process is terminated. Another aspect of the runtime monitor is that it can adjust to different execution phases of the same process. For example, a process may go through phases of high memory access and low memory access, which present different monitoring conditions. The runtime monitor can alter how the process is monitored as it passes through these phases, and optimize how the process is monitored in each phase.

Figure 1:
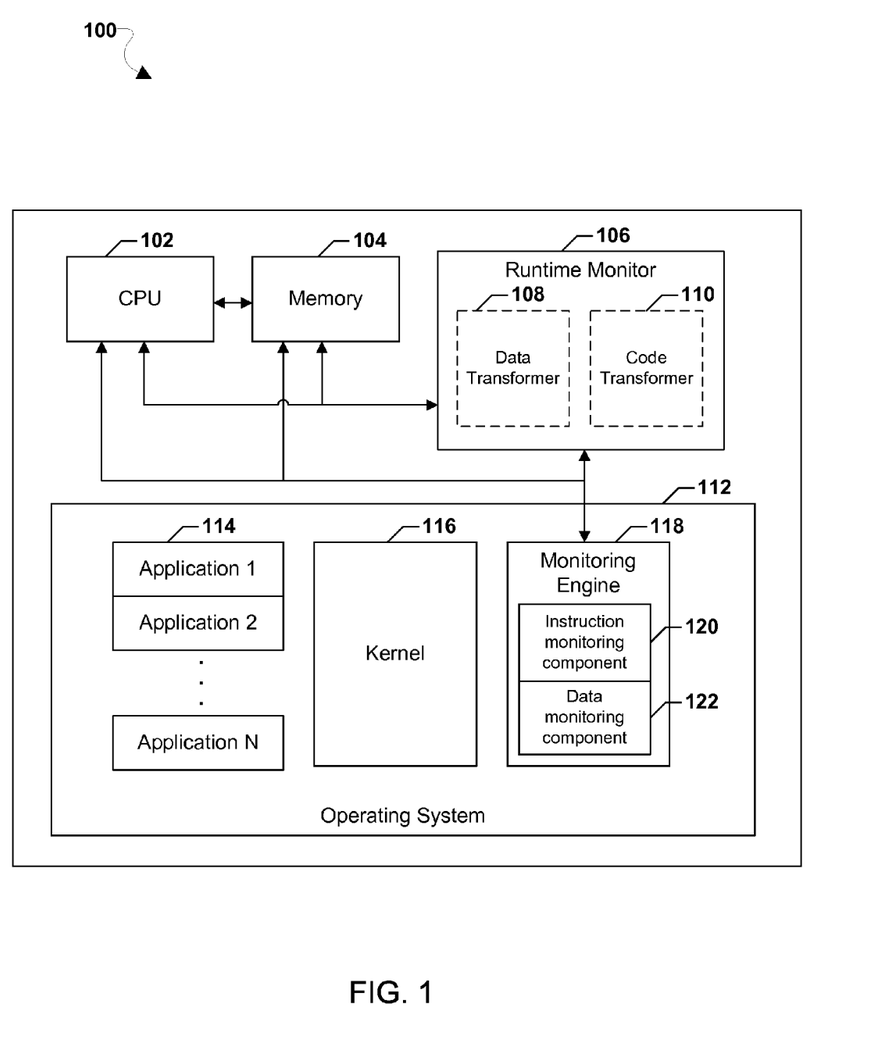
FIG. 1 is a block diagram of a computing device for use with various aspects.

FIG. 1 is a functional block diagram of a computing device 100 suitable for implementing various aspects. The computing device 100 may be, among other things, a desktop computer, laptop, any type of mobile electronic device, a server or any type of consumer or enterprise electronic device. The computing device 100 includes a central processing unit (CPU) 102 for executing software instructions, and a memory 104 for storing code and data. The memory 104 may be a non-transitory computer-readable storage medium that stores processor-executable instructions. The memory 104 may store an operating system 112, as well as applications 114, a kernel 116, and a hardware monitoring engine 118. The memory 104 may also store application data for the applications 114, such as tables, matrices, and arrays.

A hardware monitoring engine 118 enables monitoring on the computing device 100 and may be in communication with the CPU 102, the memory 104, and the runtime monitor 106 through a communications channel such as a bus. The hardware monitoring engine 118 may be configured, among other things, to monitor particular instructions and data values stored in the memory 104, and the execution of particular instructions on the CPU 102. The hardware monitoring engine 118 may include one or more hardware monitoring components, for example, an instruction monitoring component 120 and a data monitoring component 122. The instruction monitoring component 120 may be configured to monitor software instructions while the data monitoring component 122 may be configured to monitor software data.

The computing device 100 also may include a runtime monitor 106 for providing dynamic or on-demand hardware monitoring by acting as a middle layer between the hardware monitoring engine 118 and the CPU 102 and the memory 104. The runtime monitor 106 may be implemented by specialized hardware circuitry in the computing device 100 or may be implemented in software stored on the operating system 112. The runtime monitor 106 may communicate with the hardware monitoring engine 118 and may receive monitoring requests from various components in the computing device 100, such as a security engine, a performance engine, or a reliability engine (not illustrated in FIG. 2). The runtime monitor 106 may communicate with the hardware monitoring engine 118, the CPU 102, the memory 104, and other components in the computing device 100 through a communications channel such as a bus. The runtime monitor 106 may include memory for storing processor-executable instructions for operating the runtime monitor, which may be updateable through firmware updates. The runtime monitor 106 may receive monitoring requests and generate one or more monitoring configuration parameters from the monitoring requests (i.e., based on information included in the monitoring requests). The monitoring configuration parameters may be used to instruct the hardware monitoring components 120, 122 on how to monitor the code or data based on the monitoring request. The runtime monitor 106 may analyze the performance of the hardware monitoring components 120, 122 of the hardware monitoring engine 118 during monitoring. The runtime monitor 106 may utilize a general performance monitor (not illustrated) stored in the operating system 112, or may store a specialized performance monitor for analyzing hardware monitoring requests.

The runtime monitor 106 may be configured to identify non-optimal event patterns that occur while the hardware monitoring components 120, 122 monitors the code or data. In response to identifying a non-optimal event pattern, the runtime monitor 106 may apply a transformation to the code or data being monitored in order to improve monitoring performance. The runtime monitor 106 may perform a transformation of code using a code transformer 110, or a transformation of data using a data transformer 108. The code transformer 110 and the data transformer 108 may be runtime compilers that act on the memory 104 and the CPU 102 to perform transformations such as the relocation or restructuring of code or data, or conversion of code monitoring to data monitoring and vise versa. The runtime monitor 106 may also reconfigure the one or more of the hardware monitoring components 120, 122 in the hardware monitoring engine 118 to account for any transformations made to the code or data being monitored. For example, the runtime monitor 106 may modify the monitoring configuration parameter for a corresponding hardware monitoring component to update memory addresses of code or data that may have been moved in the transformation.

The runtime monitor 106 may then analyze whether the transformation improved the performance of the non-optimal event pattern, and may experiment with different transformations to determine the transformation that works best. The runtime monitor 106 may store a database of known non-optimal event patterns and associated transformations, which may be updated over time. The runtime monitor 106 may include a machine learning engine that determines the transformation that best improves a particular non-optimal event pattern, thus improving the effectiveness of the runtime monitor 106. The runtime monitor 106 may itself be subjected to performance monitoring to ensure that the transformations do not introduce additional resource overhead that outweighs the benefits of the transformation. Thresholds or resource budgets may be used to determine the amount of processing or memory resources that are available to the runtime monitor 106.

The computing device 100 may also include various other components not illustrated in FIG. 1. For example, the computing device 100 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

A runtime monitor, such as the runtime monitor 106 in FIG. 1, may perform a number of transformations on code or data to improve hardware monitoring functions. The transformations may include the relocation or restructuring of code or data, or both, or other transformations that convert code monitoring to data monitoring and vise versa. An example of a transformation 200 that restructures code monitoring to memory address monitoring is shown in FIG. 2.

Figure 2:
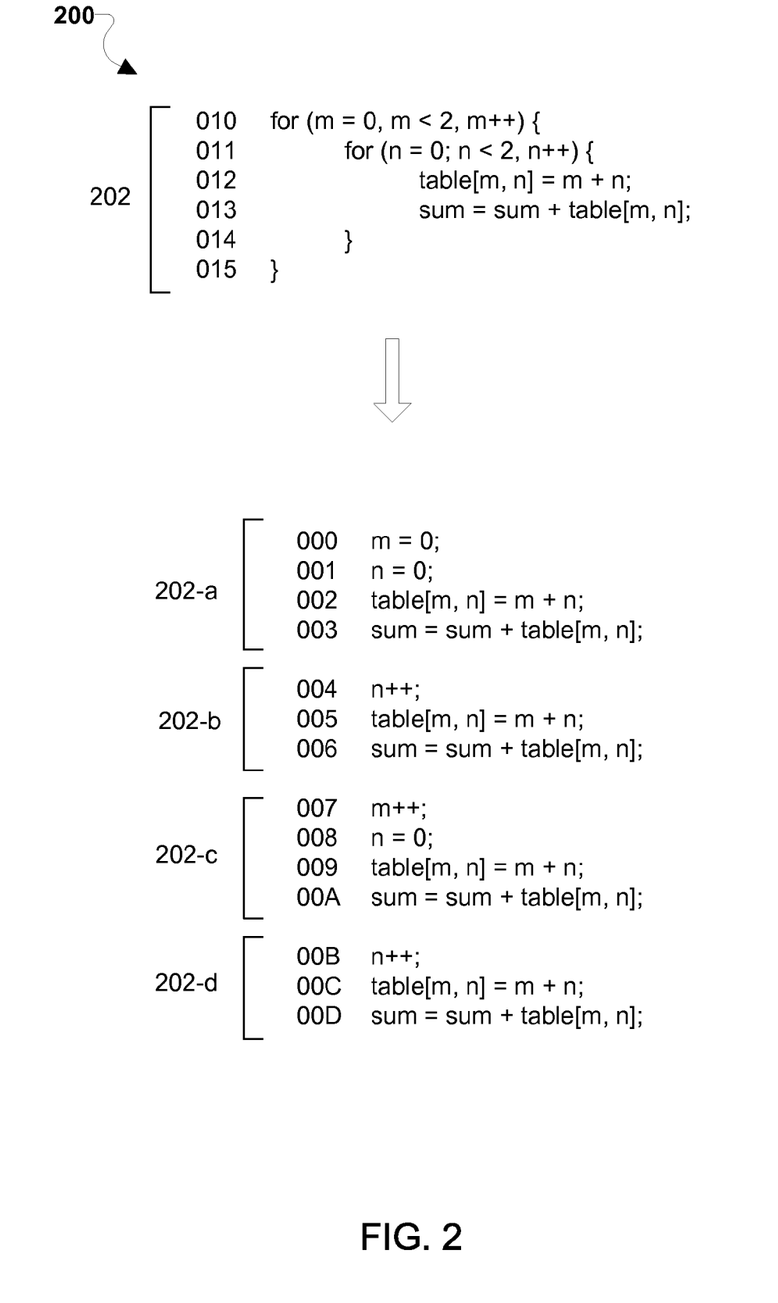
FIG. 2 is an example of a loop unrolling code transformation according to various aspects.

FIG. 2 illustrates an example of a loop 202 that may appear in the code of a process or application. In the illustrated example, the loop 202 is a nested for loop conditioned upon the variables m and n. Two operations are shown in the loop 202, an operation for setting data values in a table, and a cumulative sum operation. The outer loop is repeated as long as variable m is less than two, with m being incremented by one at the end of each iteration of the outer loop. The inner loop is repeated as long as variable n is less than two, with n being incremented by one at the end of each iteration of the inner loop. Thus, the loop runs four times before proceeding on to the next instruction. The numbers 010 through 015 represent the virtual memory address where the instruction on that particular line is located. The loop 202 may be stored in various ways in virtual memory and the virtual memory address may be represented a number of different ways. The memory addresses shown in FIG. 2 are only illustrative.

A monitoring request may target monitoring of the loop 202 in a variety of ways. For example, a monitoring request may only target the sum variable. In another example, a monitoring request may only target the iteration of the loop where m=1 and n=0. In yet another example, the monitoring request may target the data value at stored in table [1, 1]. Normally, the hardware monitoring engine tracks execution of the entire loop to monitor the portions of the loop it is interested in. The loop 202 as illustrated is a short loop, but often in applications loops may be long, complicated, or recursive. The code or data being monitored may only be run or accessed a few times during execution of the entire loop. In these situations, it is inefficient for a hardware monitoring engine to track the execution of an entire loop to monitor one particular instruction or data value, and thus a non-optimal event pattern arises. A runtime monitor may transform the loop 202 by unrolling the loop, or explicitly storing each iteration of the loop in distinct memory locations. This is shown in FIG. 2, where the loop 202 is transformed into code segments 202-*a* through 202-*d*. Each code segment is the same as the body of the loop 202, except that the variables m and n are explicitly incremented rather than using a loop mechanism to increment the variable.

After the runtime monitor unrolls the loop 202, the runtime monitor also reconfigures the hardware monitoring component in the monitoring engine that monitors the loop (e.g. an instruction monitoring component). The monitoring configuration parameter generated from the monitoring request would normally include the memory addresses where the loop is stored, that is memory addresses 010-015. The runtime monitor would modify the monitoring configuration parameter to point to the specific virtual memory addresses that store the targeted instruction or data value in the unrolled code. For example, if the monitoring request targets the sum variable, the runtime monitor would modify the monitoring configuration parameter to point to memory addresses 003, 006, 00A, and 00D, where the sum variable appears in the code segments 202-*a* through 202-*d*. All other lines in the code segments 202-*a* through 202-*d* may be ignored as they do not involve the sum variable. The hardware monitoring component may be reconfigured by the changed monitoring configuration parameter to monitor the new memory addresses. In another example, if the monitoring request targets the iteration of the loop where m=1 and n=0, the runtime monitor may modify the monitoring configuration parameter to point to memory addresses 007-00A. In yet another example, if the monitoring request targets the data value at table [1, 1], the runtime monitor modify the monitoring configuration parameter to point to memory address 00C. Alternatively, pointers or lookup tables may be used to redirect the hardware monitoring component to the proper memory addresses.

The extent of transformations such as unrolling a loop may be dependent upon conditions in the monitoring request. For example, a monitoring request may target the iteration of the loop where m=1 and n=0. In this case, the runtime monitor may only unroll the loop 202 into the code segments 202-*a* through 202-*c*, and not unroll the loop any further. This is because the iteration of the loop where m=1 and n=0 is reached in the code segment 202-*c*, and so unrolling the loop 202 further into the code segment 202-*d* is not necessary. Various conditions in the monitoring request, such as ranges or values of data structures, or ranges of instructions, or particular iterations of the loop, may determine how many code segments should be unrolled from a loop before the monitoring request can be satisfied.

Figure 3:
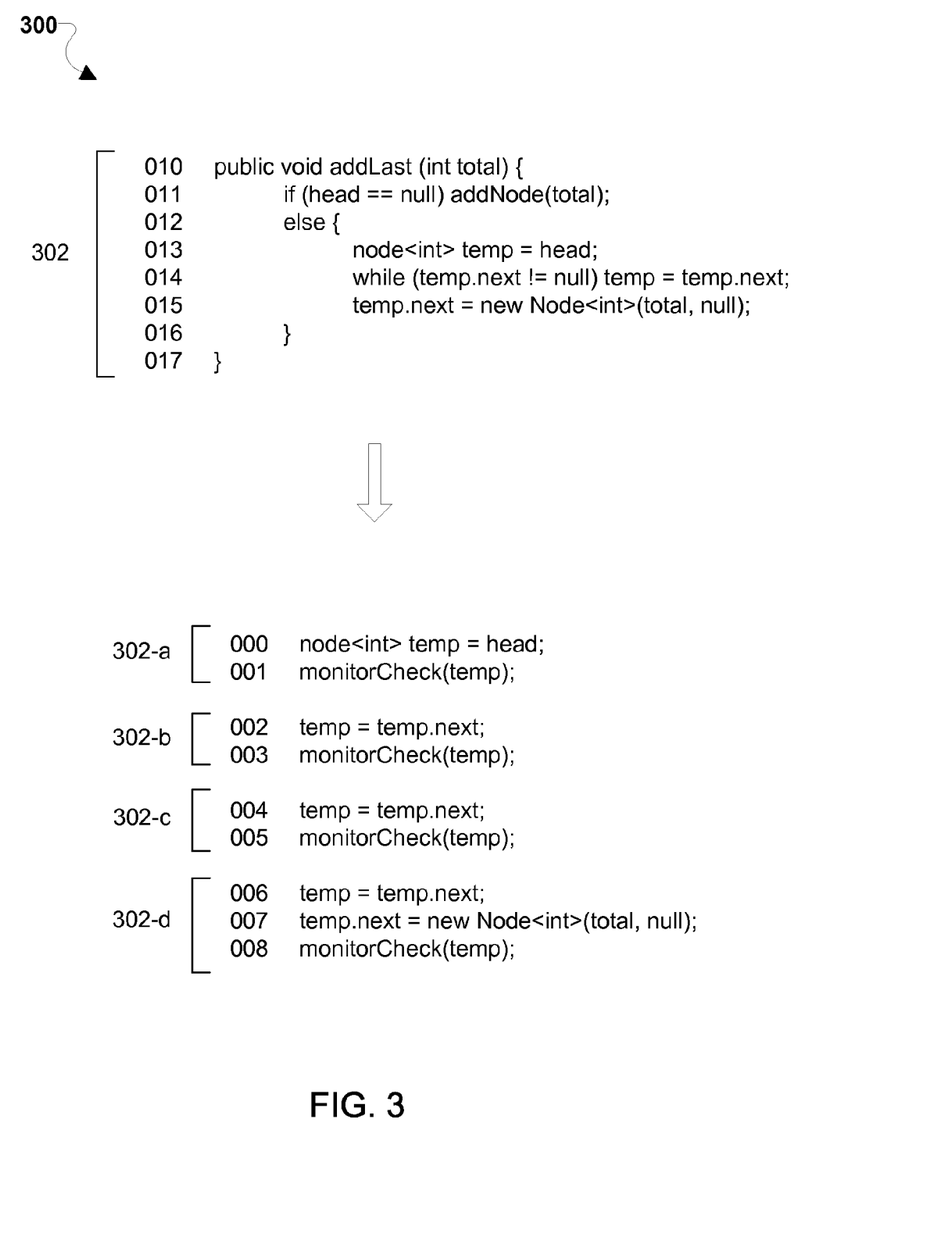
FIG. 3 is another example of a loop unrolling code transformation according to various aspects.

FIG. 3 illustrates an example of a transformation 300 that unrolls a loop that traverses a recursive data structure. A recursive data structure, such as a tree or linked list, may be monitored for changes to the data structure. However, it may be inefficient to monitor all the code locations within a loop that update the data structure. Instead, similar to the method 200 in FIG. 2, the loop may be unrolled and specific code segments that affect the data structure may be monitored. FIG. 3 shows an addLast function 302 that is used to add a node to the end of a linked list. The function 302 starts at the beginning of the linked list and, as long as the linked list is not empty, uses a while loop to find the last node in the linked list. Once the function 302 finds the last node, the function 302 adds a new node to the end of the linked list and sets the data value of the node.

If a monitoring request is only interested in monitoring code that changes the structure of the linked list, a non-optimal event pattern may arise when the hardware monitoring components (e.g. an instruction monitoring component and a data monitoring component) monitor the entire execution of the function 302 as instructed by monitoring configuration parameters generated from the monitoring request. Instead, the function 302 may be unrolled into code segments 302-*a* through 302-*d* (assuming the linked list is 4 nodes long), where each code segment traverses one node of the linked list. The runtime monitor may add, append, or wrap each code segment with a test function to determine whether the code segment changes the data structure. In the example shown in FIG. 3, the function monitorCheck( ) is found in each of the code segments 302-*a* through 302-*d*.

This function determines whether the current node of the linked list has been changed by the unrolled segment of the loop 302. The runtime monitor may then reconfigure the hardware monitoring components by modifying the monitoring configuration parameter to point to the function in each code segment, at virtual memory addresses 001, 003, 005, and 008, to determine whether the structure of the linked list has changed. In FIG. 3, a new node was added in the code segment 302-d and so the output of the function monitorCheck( ) at the code segment 302-d would indicate a change to the data structure. There are a number of ways a wrapping or check function such as monitorCheck( ) may be implemented and incorporated in each code segment, which may depend on the loop being unrolled or the data structure being monitored. Thus, the transformation 300 is an example of a code restructuring transformation that also adds additional instructions to aid in monitoring.

Figure 4:
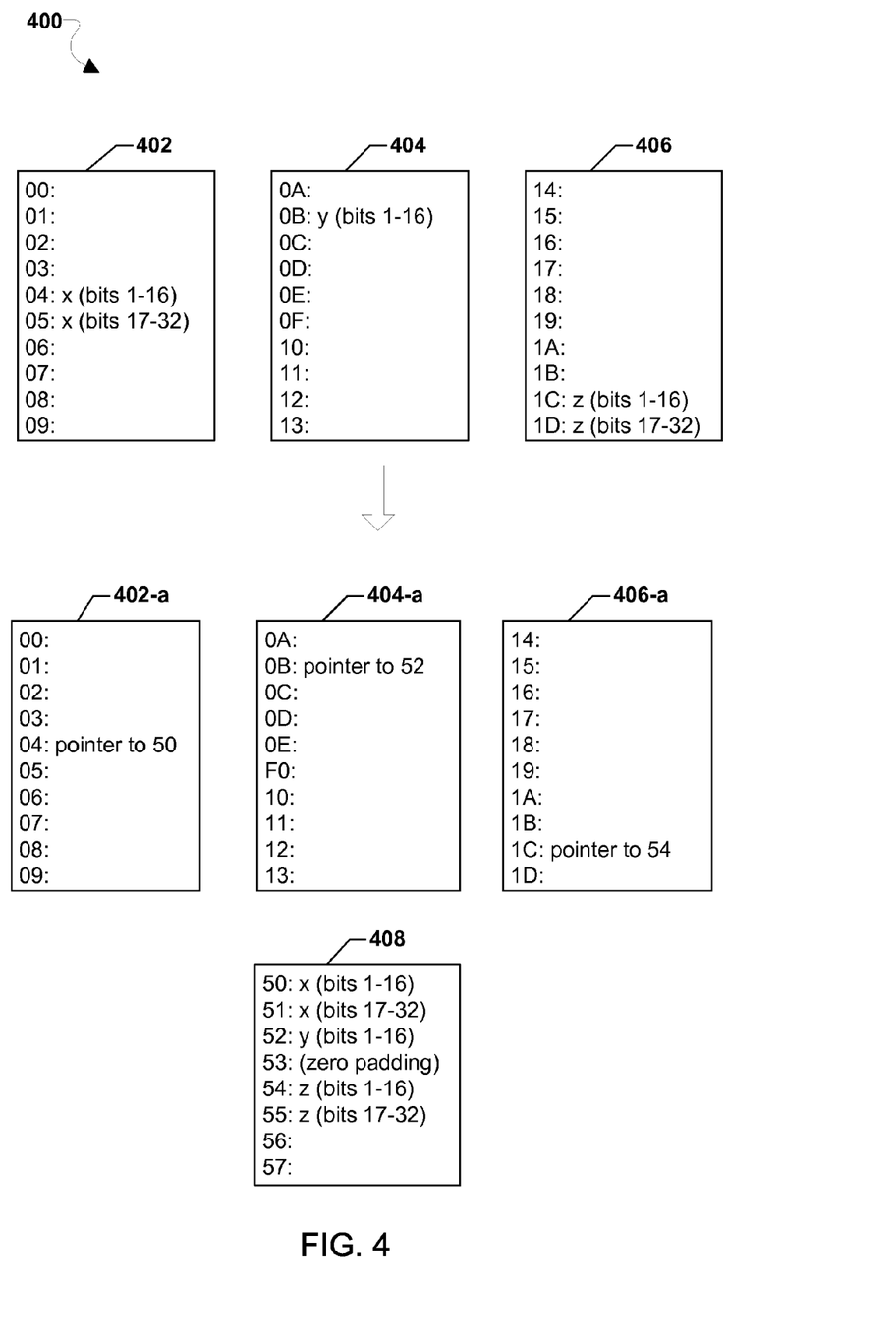
FIG. 4 is an example of a relocation transformation according to various aspects.

While FIGS. 2 and 3 illustrate an example of a transformation that restructures code, FIG. 4 illustrates a transformation 400 for relocation of a portion of code or data. In some cases, code or data may be relocated and restructured as part of the transformation performed by the runtime monitor. FIG. 4 illustrates three virtual memory pages 402, 404, and 406. Virtual memory pages are blocks of contiguous virtual memory addresses. The memory page 402 stores a 32 bit variable x at virtual memory addresses 04-05. The memory page 404 stores a 16 bit variable y at virtual memory address 0B. The memory page 406 stores a 32 bit variable z at virtual memory addresses 1C-1D.

A runtime monitor on a computing device may receive a monitoring request to monitor the values of the variables x, y, and z. The monitoring configuration parameters generated from the monitoring request may point a hardware monitoring component (e.g. a data monitoring component) to the memory addresses of the variables x, y, and z. Because the variables are stored on separate memory pages, the hardware monitoring component would have to first find the memory pages before it could find the variables stored in the memory pages. It may take a large amount of time for the hardware monitoring component to switch between the memory pages during monitoring. This is a non-optimal event pattern that the runtime monitor may fix by relocating the variables to the same virtual memory page.

In FIG. 4, the runtime monitor relocates, or moves, the variables x, y, and z from the respective memory pages 402, 404, and 406 to a single memory page 408. Variable x is now stored at memory address 50 in the memory page 408, variable y is stored at memory address 52, and variable z is stored at memory address 54. In FIG. 4, the runtime monitor also pads variable y with zeros to make it a 32 bit variable. This padding may be done to better suit cache alignment or the memory granularity of hardware monitoring. However, sometimes padding is not done, in which case variable z would be stored in address 53 instead. When the variables are all located on the same memory page, memory access to each variable becomes quicker.

The runtime monitor may store an address lookup table that stores the new location of the variables so that the hardware monitoring component is directed to the correct address. Alternatively, the runtime monitor may add pointers in the original memory addresses of the variables that point to the new memory location, which is shown in FIG. 4. Thus, in the memory page 402-a, a pointer is added at memory address 04 that points to memory address 50, the new location of variable x. Likewise, in memory page the 404-a, a pointer is added at memory address 0B that points to the new memory address 52 of variable y, and in the memory page 406-a, a pointer is added at memory address 1C that points to the new memory address 54 of variable z. Alternatively, the runtime monitor may simply modify the monitoring configuration parameters to point to the new memory address locations. In each alternative, the hardware monitoring component is reconfigured to monitor the new memory address locations.

Although the relocation of data is shown in FIG. 4, code may also be relocated by the runtime monitor. Multiple software instructions that are being monitored but are stored on separate memory pages may be relocated to the same memory page and the monitoring request is redirected by the runtime monitor to the correct address. Also, restructuring and relocation may both be done to a portion of code or data. For example, the loop 202 in FIG. 2 may be moved to a different memory address and then unrolled.

Figure 5:
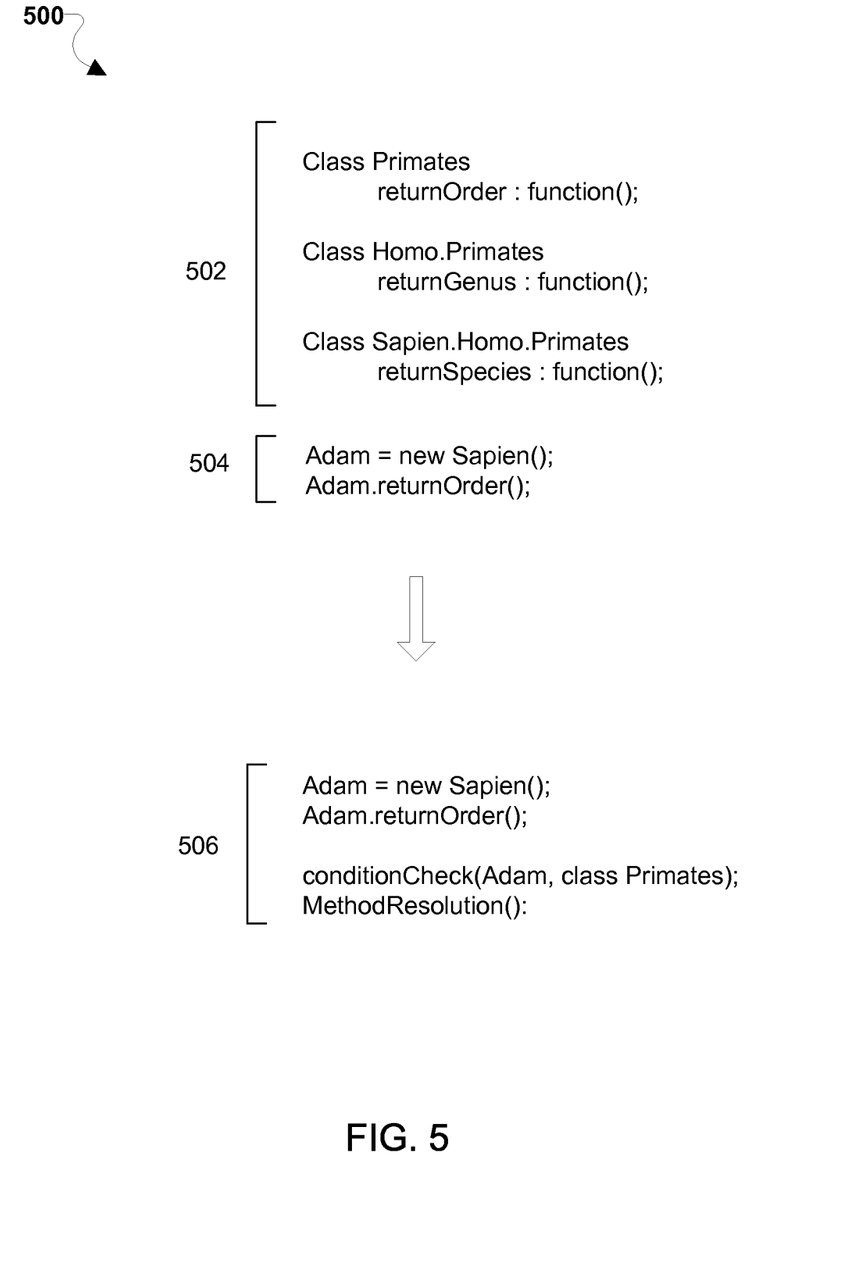
FIG. 5 is an example of a restructuring transformation to handle method resolution according to various aspects.

FIG. 5 shows an example of a transformation 500 for dealing with monitoring method resolution in dynamic programming languages. In software code, object classes may inherit properties and functions from one or more parent classes. When an instance of an object class calls a particular function, method resolution is utilized to determine the inherited class that defines the function. This is especially useful if multiple classes have the same function name as the processor has to identify the function that a particular object is calling. If a monitoring request targets an inherited function, it may be inefficient for a hardware monitoring component (e.g. an instruction monitoring component) to monitor execution of the method resolution code to identify cases when the method resolution results in the targeted function. This is a non-optimal event pattern that may be improved through a transformation.

Code segment 502 illustrates pseudo-code defining functions for multiple object classes. The code segment 502 defines an object class Primates, which includes a function returnOrder( ). The code segment 502 also defines an object class Homo, which is a child class of the class Primates, and includes a function returnGenus( ). The object class Homo also inherits the function returnOrder( ) from its parent class. Lastly, the code segment 502 defines an object class Sapien, which is a child class of the class Homo and a grandchild class of the class Primates, and includes a function returnSpecies( ). The object class Homo also inherits the function returnOrder( ) from its grandparent class and the function returnGenus( ) from its parent class. A later code segment 504 illustrates pseudo-code that creates an instance of the Sapien class named Adam, and calls the function returnOrder( ) for the Adam object. A method resolution function would first search the definition of the Sapien class in the code segment 502 to find the returnOrder( ) function. As the Sapien class does not define such a function, the method resolution function would search the parent class, Homo, and then the grandparent class Primates to find the function. Once the method resolution function identifies the correct function, it is executed.

If a monitoring request targets the returnOrder( ) function, the runtime monitor may at first monitor the method resolution function until the caller of the function (Adam) and the object owning the monitored function (class Primates) results in the method resolution function returning the targeted function. The runtime monitor may then add code at the beginning of the method resolution function that checks whether the method resolution function is called again later by the same caller (Adam) and same object owning the targeted function (class Primates). Code segment 506 illustrates pseudo-code with an example function conditionCheck( ) that checks whether the method resolution function is being called by the caller Adam and object class Primates. The runtime monitor may then reconfigure the hardware monitoring component to monitor the result of the conditionCheck( ) function by modifying the monitoring configuration parameter associated with the hardware monitoring component to include the function as a memory address to be monitored. If the function confirms that the same caller and object is triggering the method resolution, the hardware monitoring component knows the method resolution will result in the targeted function and so does not need to monitor the method resolution function itself. If the caller and object do not match the conditionCheck( ) function, the hardware monitoring component then has to monitor the method resolution function to determine if the targeted function is identified by the method resolution function. In this manner, the runtime monitor may add one or more of the conditionCheck( ) functions to the beginning of the method resolution function that act as shortcuts to identify the combinations of callers and objects that result in the targeted function. There are a number of ways a function such as conditionCheck( ) may be implemented and incorporated into method resolution, which may depend on how the targeted function is called and the structure of the method resolution code. Thus, the transformation 500 is an example of transforming code by adding instructions that act as a shortcut to identify whether a monitored portion of code or data is called in a dynamic environment.

Figure 6:
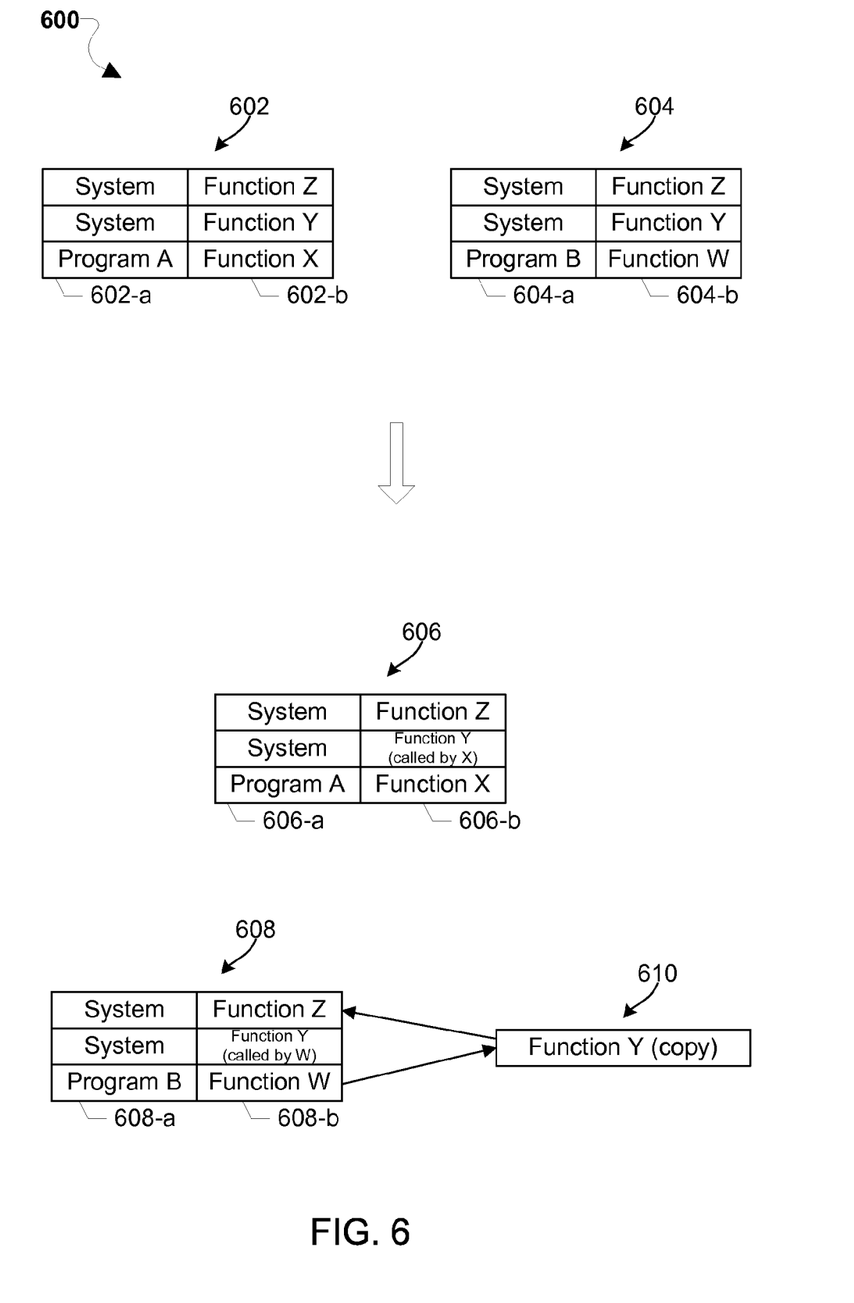
FIG. 6 is an example of a duplicate function transformation according to various aspects.

FIG. 6 illustrates an example of a transformation 600 for monitoring functions based on their calling context. For example, a monitoring request may target a particular function only when it is executed in particular contexts, such as when it is called by particular programs. It may be inefficient to check the context of the function each time the function is called. A non-optimal event pattern then arises if a hardware monitoring component (e.g. an instruction monitoring component) has to monitor all executions of the function but is only interested in certain instances of execution. An example of when this may occur is during stack inspection of a function call stack, which may be done to monitor access control.

FIG. 6 illustrates a call stack 602 for Program A, which shows the functions called during execution of Program A. Column 602-a of the call stack 602 lists the owner of the function being called, while column 602-b lists the function being called. Thus, in the call stack 602 Program A calls its own function X. Function X, in turn, calls a function Y that belongs to the operating system of the device executing Program A. Function Y, in turn, calls another system function Z. Likewise, FIG. 6 also illustrates a call stack 604 for Program B, where 604-a of the call stack 604 lists the owner of the function being called and column 604-b lists the function being called. In the call stack 604 Program B calls its own function W. Function W, in turn, calls a function Y that belongs to the operating system of the device executing Program B. Function Y, in turn, calls another system function Z.

A monitoring request may target function Y, but only when called by function W. Thus, the monitoring request monitors function Y only in a particular context. The runtime monitor may transform the targeted function so that it is only monitored when the context is satisfied. The runtime monitor may insert instructions within function Y to check its context. For example, the runtime monitor may add an instruction to check the function that is calling function Y. If the function calling function Y is function W, the runtime monitor duplicates function Y on a separate memory space and reconfigures the hardware monitoring component to monitor the duplicated function. This may be accomplished by modifying the monitoring configuration parameter associated with the hardware monitoring component to point to the duplicated function. This transformation is shown in call stacks 606 and 608 in FIG. 6. The call stack 606 is similar to the call stack 602 for Program A, except that code is inserted that checks the function that calls function Y. Because function X called function Y, the hardware monitoring component may ignore this instance of function Y. The call stack 608 is similar to the call stack 604 for Program B, except that code is inserted that checks the function that calls function Y. Because function W called function Y, the runtime monitor makes a duplicate function 610 of function Y in a separate memory space. The runtime monitor may then modify the call stack 608 to call the duplicate function 610 instead of the function stored within the call stack 608. The runtime monitor may then reconfigure the hardware monitoring component to monitor the duplicate function 610 instead of the function located in the call stack 608.

By making such duplicate functions when certain conditions are met and directing the hardware monitoring component to monitor the duplicate functions, the runtime monitor may enable monitoring of a function only in particular contexts. The hardware monitoring component does not have to monitor the function when the context is not satisfied. Thus, the transformation 600 is an example of transforming code so that monitoring may be accomplished in particular contexts.

FIGS. 2-6 show examples of transformations that the runtime monitor may apply to portions of code or data within a process that is being monitored. However, various other transformations may be developed for a number of non-optimal event patterns and code or data structures that exist. Also, the process being monitored may alter its run-time behavior, in which case different non-optimal event patterns may emerge. For example, a video application may be switched between playing a video, which includes a high number of memory accesses, to not playing any video, where the number of memory accesses decreases. The runtime monitor may undo transformations, change transformations, or apply new transformations to adjust for the process' new behavior. For example, in a first phase of a process variables x and y in FIG. 4 are accessed frequently while variable z is never accessed. The runtime monitor may relocate variables x and y to the memory page 408 for monitoring. In a second phase of the process, variables x and z are accessed frequently while variable y is never accessed. The runtime monitor may remove variable y from the memory page 408 and restore it to its original location in the memory page 404, and relocate variable z to the memory page 408. The hardware monitoring components may also be similarly reconfigured at each phase of the process.

The runtime monitor may also reverse any transformation it has previously applied if the transformation does not improve the non-optimal event pattern. For example, any relocated code or data may be moved back to its original location in memory and any restructuring of code or data, such as padding or unrolling, may be also reversed. The runtime monitor may also undo the reconfiguration of hardware monitoring components, such as by reverting to the original monitoring configuration parameters used by the hardware monitoring components. This allows the runtime monitor to experiment with different transformations to determine the transformation that is most effective at improving the non-optimal event pattern. Additionally, once the process being monitored is terminated, all of the code and data for the process, including any transformations by the runtime monitor, may be removed from memory. Thus, each time the process is started, the runtime monitor optimizes hardware monitoring from the original code and data, and does not retain information from previous executions of the process. The result may be on-demand or dynamic hardware monitoring optimization.

Figure 7:
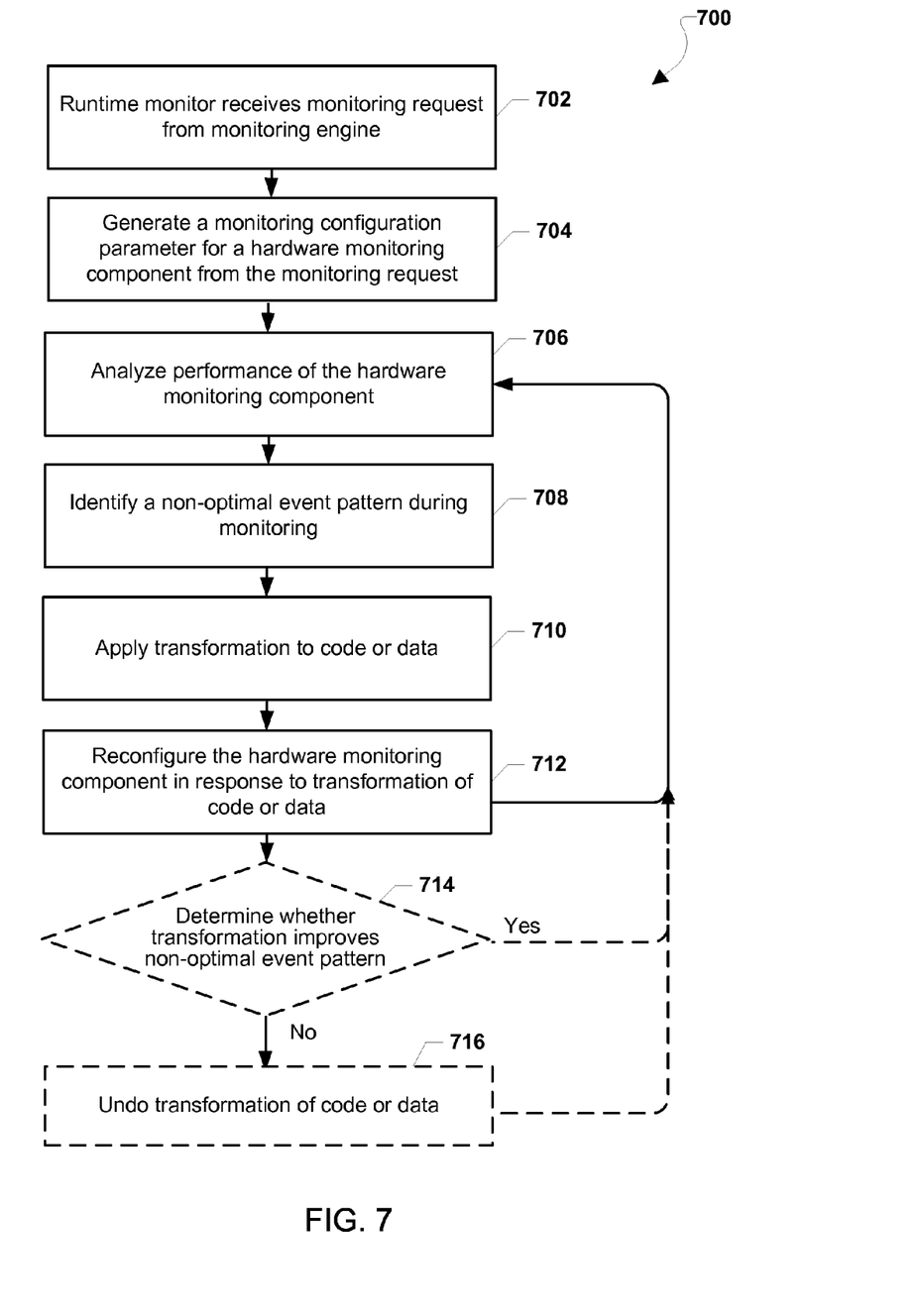
FIG. 7 is a process flow diagram illustrating a method for optimizing hardware monitoring according to various aspects.

FIG. 7 illustrates a method 700 for implementing on-demand optimization of hardware monitoring on a computing device according to an aspect. The method 700 may be implemented by a runtime monitor (e.g., the runtime monitor 106 of FIG. 1) of a computing device (such as the computing device 100 of FIG. 1). The computing device may also contain a hardware monitoring engine, such as the monitoring engine 118 in FIG. 1, which may include one or more hardware monitoring components. The monitoring engine may monitor the performance, security, or reliability of the computing device. The runtime monitor may act as a middle layer between the monitoring engine and the resources being monitored, such as a CPU and memory.

In block 702, the runtime monitor may receive a monitoring request from a component within the computing device, such as a security engine, performance engine, or reliability engine. The monitoring request targets a portion of code or data within a process executing on the computing device, such as an application or operating system process. In block 704, the runtime monitor may generate one or more monitoring configuration parameters from the monitoring request (i.e., based on information included in the monitoring request). The monitoring configuration parameters inform the hardware monitoring components about the memory addresses, instructions, and/or data values to monitor. For example, if the monitoring request is to monitor a particular function only when it has a particular input data value, the monitoring configuration parameters generated from the monitoring request may include the memory address location of the function and the memory address of the input data value along with the monitored data value. The memory configuration parameter specifying the address of the function may be used by an instruction monitoring component to monitor the function. The memory configuration parameter specifying the address of the input data value and the monitored data value to be monitored may be used by a data monitoring component to monitor the data value of the input to the function.

In block 706, the runtime monitor may analyze the performance of the one or more hardware monitoring components performing the monitoring according to the monitoring configuration parameters for performance slowdowns. These slowdowns may include, among other things, time to complete the monitoring request, memory violations, cache effects or overflows, and memory access latency. The runtime monitor may store a performance monitor for analyzing the performance of the hardware monitoring components, or may utilize a general performance monitor stored on the computing device.

In block 708, the runtime monitor may identify a non-optimal event pattern while analyzing the performance of the hardware monitoring components. A non-optimal event pattern may be a task performed by the hardware monitoring components that exceeds a performance slowdown threshold at least once, for example a threshold amount of time for memory access latency, or a threshold amount of memory in a cache overflow. The non-optimal event pattern may be caused by inefficient operation of the hardware monitoring components, such as frequent access of portions of code or data located in different virtual memory pages, or monitoring of code or data within a complex loop.

In block 710, the runtime monitor may apply a transformation to the portion of code or data. The transformation is intended to improve the non-optimal event pattern by changing how the code or data is stored or accessed to better suit the monitoring activities of the hardware monitoring components. The transformations do not change the operation of the process being monitored, but only alter how code or data is stored and accessed to make hardware monitoring more efficient. Transformations may include the relocation or restructuring of code or data, or transformations that convert code monitoring to data monitoring and vise versa. Examples of transformations are shown with respect to FIGS. 2-6. For example, the transformation may be an unrolling of a loop, the relocation of several pieces of code or data onto a single virtual memory page, or the addition of code to monitor functions called in particular contexts or environments. The runtime monitor may include a database that associates known non-optimal event patterns with known transformations, and implements the appropriate transformation when it encounters a particular non-optimal event pattern. The runtime monitor may also include a machine learning module that allows the runtime monitor to determine over time the transformations that are effective for various non-optimal event patterns. The runtime monitor may also have firmware that allows new transformation to be uploaded to the runtime monitor through firmware updates.

In block 712, the runtime monitor may reconfigure the hardware monitoring component by modifying the monitoring configuration parameters based on or in response to the transformation. Such reconfiguring may include modifying the monitoring configuration parameters to redirect the hardware monitoring components to new memory address locations where code or data has been relocated. This may be accomplished through address lookup tables, pointers, or other methods. The reconfiguration ensures that the hardware monitoring components will target the same code or data even though it may have been moved or restructured.

After the transformation and reconfiguration is complete, the runtime monitor may continue to analyze the performance of the hardware monitoring components in block 706 to identify another non-optimal event pattern in block 708. This process may continue until execution of the process being monitored ends.

Optionally, the runtime monitor may analyze whether the transformation improved the non-optimal event pattern in optional determination block 714. For example, the runtime monitor may use a performance monitor to determine whether the thresholds that triggered the non-optimal event pattern are still being met. In response to determining that the transformation did improve the non-optimal event pattern (i.e., optional determination block 714="Yes"), the transformation may be left in place and the runtime monitor may continue to analyze the performance of the hardware monitoring components in block 706 to identify another non-optimal event pattern in block 708.

In response to determining that the transformation did not improve the non-optimal event pattern (i.e., optional determination block 714="No"), the runtime monitor may undo the transformation of code or data in optional block 716. The runtime monitor may continue to analyze the performance of the hardware monitoring components in block 706 to identify another non-optimal event pattern in block 708, which may be the same non-optimal event pattern as before or a different one. In this manner, the method 700 enables the optimization of hardware monitoring on a computing device. This optimization may occur on the fly as the process being monitored is executing. When the process is terminated, the transformations done to the process may not be stored, but rather the optimization starts fresh the next time the process is executed.

Figure 8:
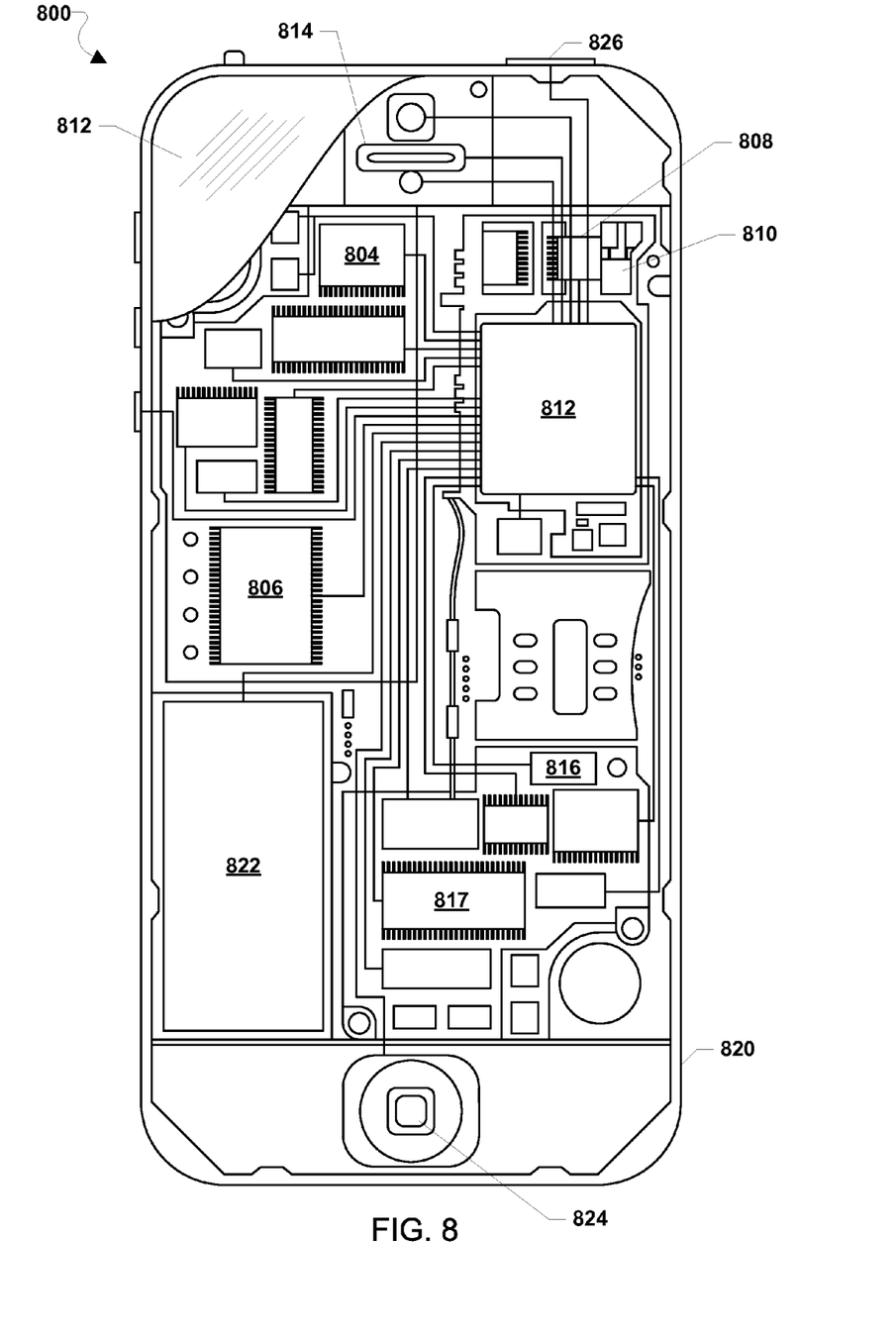
FIG. 8 is a component block diagram of a mobile communication device suitable for implementing some aspect methods.

Various aspects may be implemented in any of a variety of computing devices, an example of which (e.g., communication device 800) is illustrated in FIG. 8. According to various aspects, the communication device 800 may be similar to the computing device 100 as described above with reference to FIG. 1. As such, the communication device 800 may implement the method 700 in FIG. 7.

Thus, with reference to FIGS. 1-8, the communication device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 504 and the processor 802 may also be coupled to a touchscreen panel 812, such as a resistive-sensing touchscreen, capacitive-sensing touchscreen, infrared sensing touchscreen, etc. Additionally, the display of the communication device 800 need not have touch screen capability.

The communication device 800 may have a cellular network transceiver 808 coupled to the processor 802 and to an antenna 810 and configured for sending and receiving cellular communications. The transceiver 808 and the antenna 810 may be used with the above-mentioned circuitry to implement various aspect methods. The communication device 800 may include one or more SIM cards 816 coupled to the transceiver 808 and/or the processor 802 and may be configured as described above. The communication device 800 may include a cellular network wireless modem chip 817 that enables communication via a cellular network and may be coupled to the processor.

The communication device 800 may also include speakers 814 for providing audio outputs. The communication device 800 may also include a housing 820, constructed of a plastic, metal, or a combination of materials, for containing all or some of the components discussed herein. The communication device 800 may include a power source 822 coupled to the processor 802, such as a disposable or rechargeable battery. The rechargeable battery may also be coupled to the peripheral device connection port to receive a charging current from a source external to the communication device 800. The communication device 800 may also include a physical button 824 for receiving user inputs. The communication device 800 may also include a power button 826 for turning the communication device 800 on and off.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the present aspects. Various modifications to these aspects will be readily apparent to those skilled in the art, and the generic principles defined herein may be applied to some aspects without departing from the spirit or scope of the written description. Thus, the present disclosure is not

What is claimed is:

1. A method for optimizing hardware monitoring on a computing device, comprising:
   receiving, on the computing device, a monitoring request to monitor a portion of code or data within a process executing on the computing device;
   generating from the monitoring request a first monitoring configuration parameter for a first hardware monitoring component in the computing device;
   identifying a non-optimal event pattern that occurs while the first hardware monitoring component monitors the portion of code or data according to the first monitoring configuration parameter, wherein identifying the non-optimal event pattern comprises analyzing performance of the first hardware monitoring component as the first hardware monitoring component monitors the portion of code or data;
   applying a transformation to the portion of code or data; and
   reconfiguring the first hardware monitoring component by modifying the first monitoring configuration parameter in response to the transformation of the portion of code or data.

2. The method of claim 1, the method further comprising:
   determining whether the transformation of the portion of code or data improved performance of the non-optimal event pattern; and
   undoing the transformation of the portion of code or data and the reconfiguring of the first hardware monitoring component when the transformation does not improve performance of the non-optimal event pattern.

3. The method of claim 1, wherein the non-optimal event pattern occurs when the first hardware monitoring component exceeds a performance slowdown threshold at least once.

4. The method of claim 1, wherein applying the transformation to the portion of code or data comprises relocating the portion of code or data from a first memory location to a second memory location.

5. The method of claim 4, wherein reconfiguring the first hardware monitoring component comprises modifying the first monitoring configuration parameter to point to the second memory location.

6. The method of claim 1, wherein applying the transformation to the portion of code or data comprises restructuring the portion of code or data.

7. The method of claim 6, wherein the portion of code or data to be monitored is within a loop, and reconfiguring the first hardware monitoring component comprises:
   storing a plurality of iterations of the loop in distinct memory locations; and
   modifying the first monitoring configuration parameter to point to one or more of the distinct memory locations.

8. The method of claim 1, wherein applying the transformation to the portion of code or data comprises adding one or more instructions to the portion of code or data.

9. The method of claim 1, wherein applying the transformation to the portion of code or data comprises selecting the transformation from a table associating a plurality of transformations with a plurality of non-optimal event patterns.

10. The method of claim 9, wherein machine learning is used to determine the transformation that is selected from the table given the non-optimal event pattern.

11. The method of claim 1, wherein when the process executing on the computing device is terminated the transformation to the portion of code or data is deleted.

12. The method of claim 1, further comprising generating, on the computing device based on information in the monitoring request, a plurality of monitoring configuration parameters including the first monitoring configuration parameter for a plurality of hardware monitoring components including the first hardware monitoring component.

13. A computing device, comprising:
   a monitoring engine, wherein the monitoring engine comprises a first hardware monitoring component; and
   a runtime monitor comprises hardware and memory configured with processor executable instructions to:
      receive a monitoring request to monitor a portion of code or data within a process executing on the computing device;
      generate from the monitoring request a first monitoring configuration parameter for the first hardware monitoring component;
      identify a non-optimal event pattern that occurs while the first hardware monitoring component monitors the portion of code or data according to the first monitoring configuration parameter, wherein identifying the non-optimal event pattern comprises analyzing performance of the first hardware monitoring component as the first hardware monitoring component monitors the portion of code or data;
      apply a transformation to the portion of code or data; and
      reconfigure the first hardware monitoring component by modifying the first monitoring configuration parameter in response to the transformation of the portion of code or data.

14. The computing device of claim 13, wherein the runtime monitor is further configured with processor executable instructions to:
   determine whether the transformation of the portion of code or data improved performance of the non-optimal event pattern; and
   undo the transformation of the portion of code or data and the reconfiguring of the first hardware monitoring component when the transformation does not improve the performance of the non-optimal event pattern.

15. The computing device of claim 14, wherein the non-optimal event pattern occurs when the first hardware monitoring component exceeds a performance slowdown threshold at least once.

16. The computing device of claim 13, wherein the runtime monitor is further configured with processor executable instructions to apply the transformation to the portion of code or data by relocating the portion of code or data from a first memory location to a second memory location.

17. The computing device of claim 16, wherein the runtime monitor is further configured with processor executable instructions to reconfigure the first hardware monitoring component by modifying the first monitoring configuration parameter to point to the second memory location.

18. The computing device of claim 13, wherein the runtime monitor is further configured with processor executable instructions to apply the transformation to the portion of code or data by restructuring the portion of code or data.

19. The computing device of claim 18, wherein the runtime monitor is further configured with processor executable instructions to reconfigure the first hardware monitoring component when the portion of code or data to be monitored is within a loop by:

storing a plurality of iterations of the loop in distinct memory locations; and modifying the first monitoring configuration parameter to point to one or more of the distinct memory locations.

20. The computing device of claim 13, wherein the runtime monitor is further configured with processor executable instructions to apply the transformation to the portion of code or data by adding one or more instructions to the portion of code or data.

21. The computing device of claim 13, wherein the runtime monitor is further configured with processor executable instructions to apply the transformation to the portion of code or data by selecting the transformation from a table associating a plurality of transformations with a plurality of non-optimal event patterns.

22. The computing device of claim 21, wherein machine learning is used to determine the transformation that is selected from the table given the non-optimal event pattern.

23. The computing device of claim 13, wherein the runtime monitor is further configured with processor executable instructions to delete the transformation to the portion of code or data when the process executing on the computing device is terminated.

24. The computing device of claim 13, wherein the monitoring engine comprises a plurality of hardware monitoring components including the first hardware monitoring component; and the runtime monitor is further configured with processor executable instructions to generate, based on information in the monitoring request, a plurality of monitoring configuration parameters including the first monitoring configuration parameter for the plurality of hardware monitoring components.

25. The computing device of claim 13, wherein the first hardware monitoring component is one of an instruction monitoring component and a data monitoring component.

26. The computing device of claim 13, further comprising a processor coupled to the first hardware monitoring component, wherein the processor is configured with processor-executable instructions such that the monitoring engine and the runtime monitor are software modules executing on the processor.

27. A non-transitory computer readable storage medium having stored thereon processor-executable software instructions configured to cause a processor of a computing device to perform operations, comprising:

receiving a monitoring request to monitor a portion of code or data within a process executing on the computing device;

generating from the monitoring request a first monitoring configuration parameter for a first hardware monitoring component in the computing device;

identifying a non-optimal event pattern that occurs while the first hardware monitoring component monitors the portion of code or data according to the first monitoring configuration parameter, wherein identifying the non-optimal event pattern comprises analyzing performance of the first hardware monitoring component as the first hardware monitoring component monitors the portion of code or data;

applying a transformation to the portion of code or data; and reconfiguring the first hardware monitoring component by modifying the first monitoring configuration parameter in response to the transformation of the portion of code or data.

28. A computing device, comprising:

means for receiving a monitoring request to monitor a portion of code or data within a process executing on the computing device;

means for generating from the monitoring request a first monitoring configuration parameter for a first hardware monitoring component in the computing device;

means for identifying a non-optimal event pattern that occurs while the first hardware monitoring component monitors the portion of code or data according to the first monitoring configuration parameter, wherein identifying the non-optimal event pattern comprises analyzing performance of the first hardware monitoring component as the first hardware monitoring component monitors the portion of code or data;

means for applying a transformation to the portion of code or data; and means for reconfiguring the first hardware monitoring component by modifying the first monitoring configuration parameter in response to the transformation of the portion of code or data.

* * * * *